L. J. CORBIN.
Corn-Planter.
No. 217,777.  Patented July 22, 1879.
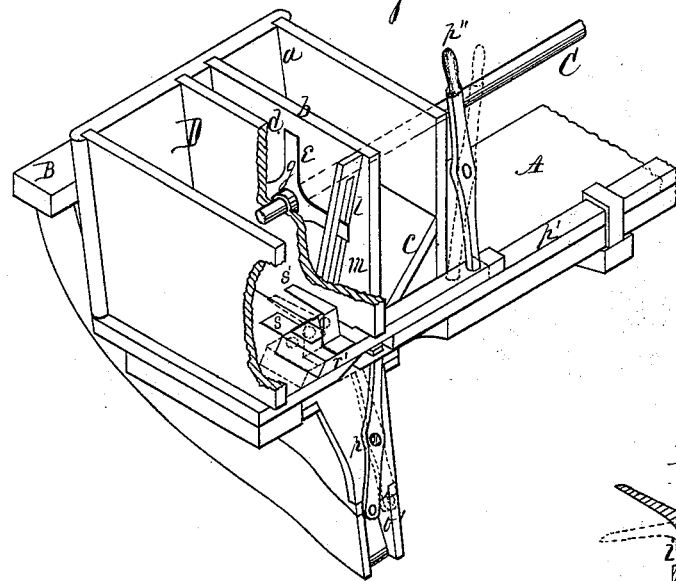
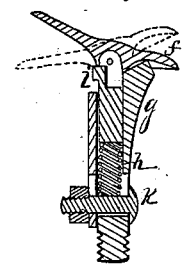
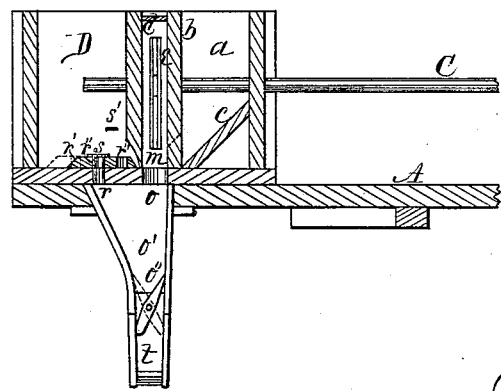
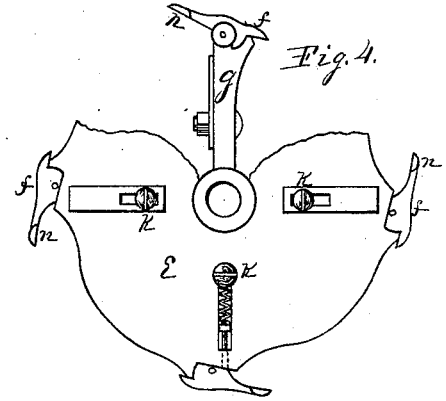
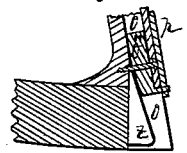
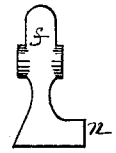
Witnesses.
A. O. Behel
O. Sovereign
Inventor.
Lyman J. Corbin
Per Jacob Behel
Atty.

UNITED STATES PATENT OFFICE.

LYMAN J. CORBIN, OF WINNEBAGO, ILLINOIS.

IMPROVEMENT IN CORN-PLANTERS.

Specification forming part of Letters Patent No. 217,777, dated July 22, 1879; application filed July 26, 1878.

*To all whom it may concern:*

Be it known that I, LYMAN J. CORBIN, of Winnebago, in the county of Winnebago and State of Illinois, have invented a new and useful Improvement in Corn-Planters, of which the following is a specification.

This invention relates to that class of corn-planters known in the trade as "horse" or "power" planters, and are employed to plant corn in hills, check-rows, or in drills.

The object of this invention is to improve the seed-distributing device secured to me in the issue of previous patents, to combine with the planter a device to distribute fertilizers to be deposited with the seed, and to provide a supplemental heel-piece to adapt the machine to operate as a combined drill and check-row planter.

To this end I have designed and constructed the machine represented in the accompanying drawings, in which—

Figure 1 is an isometrical representation of one end of the runner-frame of a corn-planter embodying my invention, in which portions of the seed and fertilizer boxes are broken away, and the cover is omitted to more clearly show the parts. Fig. 2 is a transverse vertical section through the openings through which the seed and fertilizers are discharged from the boxes into the open heel of the runner. Fig. 3 is a lengthwise vertical central section of the heel portion of the runner. Fig. 4 is a side view of a seeding-disk, showing two forms of my improved seeding device. Fig. 5 is a central section of the seeding device in the central plane of the disk, and Fig. 6 is an outer face view of pivoted bill.

In the figures, A represents a portion of the transverse beam which connects the rear ends of the runners of a corn-planter, and B represents the beam which connects their forward ends. On the outer ends of the beam A, and over the rear portion of the runner, are mounted a two-part seed-box and a fertilizer-box, in which $a$ is the seed-receptacle, separated from the distributing-chamber by a partition, $b$, through the lower edge of which there is an opening to communicate with the distributing-chamber, and through which the seed flows from the receptacle. $c$ is an inclined bottom fitted in the receptacle to conduct the seed to the opening in the lower edge of the partition. $d$ is the distributing-chamber, from which the seed is distributed.

C is a transverse horizontal shaft, the ends of which pass through the seed-receptacle and the distributing-chamber. A seed-distributing wheel, $e$, is mounted on the shaft C to revolve in the distributing-chamber. A side view of this seed-distributing wheel (enlarged) is seen in Fig. 4, in which $e$ is the wheel, of disk form, instead of which radial arms, as at $g$, may be employed, the disk having fixed to its periphery, at proper intervals, or to the outer ends of the radial arms, grasping-jaws $f$, adapted to grasp, retain, and carry the seed in its revolutions, and deposit it one grain at a time at a proper point, to be conducted to the ground through the open heel of the runner. These grasping-jaws in some respects are substantially the same as secured to me in former patents; but in this invention the spiral springs $h$, which actuate the grasping-jaws, are placed in radial grooves in the disk or arms, and exert their force on the heel of the grasping-jaws, in rear of their pivotal connection with the disk or arms, by means of radial plunger-rods $i$, placed between the springs and the heel of the grasping-jaws.

The force of these springs to regulate the grasping force of the jaws is made adjustable by means of adjusting screw-bolts $k$, which are passed through the slots in the disk or arms under the inner end of the spring, which, if moved outward or inward lengthwise of the slot, will increase or lessen the force of the spring on the grasping-jaws.

$l$ is an inclined partition placed in the seed-distributing chamber, which separates it into two compartments—the seed-distributing chamber $d$ and the discharge chamber or outlet $m$—which prevents the seed from flowing from the distributing-chamber into the discharge-chamber. This inclined partition is slotted vertically to permit the grasping-jaws, in their revolutions, to pass through it to carry the seed from the distributing-chamber into the discharge-compartment, when it is dropped from the grasping-bill by means of an inclined tripping device operating on a side arm of the rear extension of the grasping-jaw to depress it beyond the point at which the bill received the grain, to insure the delivery of the seed.

$n$ is a side arm, which extends laterally from the rear extension of the grasping-bill, and is employed to depress the rear extension of the grasping-jaw below the outer surface of the bill, at the point at which it is pivoted, to cause the bill to open wider in discharging the seed than in receiving it. This is accomplished by causing the lateral arm $n$, in the revolutions of the wheel, to pass under a tripping device at the point of delivery, placed nearer the center of the wheel than the outer surface of the bill at the point at which it is pivoted. The seed, as it is discharged from the grasping-jaws, drops through the outlet-opening $o$ into the opening $o'$ in the heel of the runner onto a flipper-valve, where it accumulates in proper quantities to form a hill.

$o''$ is a flipper-valve pivoted in the open heel of the runner, and is connected with the pivoted lever $p$, connected with the slide-connecting bar $p'$, which is operated by the pivoted hand-lever $p''$, connected with the slide-bar. By means of the hand-lever, through its connections, the flipper-valve may be thrown from side to side in the open heel, as shown in dotted lines, to permit the seed accumulated on it to drop through the open heel to the ground at the proper time to deposit it in hills or in check-rows.

D is the box to contain the fertilizer, in which $r$ is an opening, through which the fertilizer is discharged by means of the reciprocating distributing-slide $r'$, provided with receptacle $r''$, which receives the fertilizer, and in its reciprocating movement carries it under the cut-off $s$ and discharges it through the opening $r$, to be caught with the seed on the flipper-valve to be deposited with the seed. The distributing-slide $r'$ is connected to the slide-connecting bar $h'$, and operated by the same movement of the hand-lever which operates the flipper-valve. By this means the seed and fertilizer are deposited at the same time and by the same movement.

$s'$ is a bent bar fixed to the distributing-slide $r'$, and serves as an agitator to insure the filling of the receptacles in the slide.

$t$ is a supplemental heel-piece fitted to the open heel of the runner, and is employed when the machine is used as a check-row machine, and serves to conduct the seed in hills into the furrow cut by the runner as it is dropped from the flipper-valve.

When my improved planter is used as a drill to deposit a single grain in a place in quick succession and at short intervals, I remove the flipper-valve and the supplemental heel, which permits the seed, when discharged from the grasping-jaws, to drop through the opening $o$, and through the open heel of the runner, to the furrow unobstructed. By this means I produce a better combined drill and check-row planter than to me is known.

I claim as my invention—

1. The combination, with a grasping-jaw, $f$, pivoted to a seed-distributing wheel, of a plunger-rod, $i$, and spring $h$, said plunger-rod being arranged and adapted to press upon the heel of said grasping-jaw, substantially as set forth.

2. The sliding screw-bolt, in combination with the slotted disk or arm, for the purpose of increasing or decreasing the force of the spring in its operation upon the pivoted jaw, to regulate its grasping force, as and for the purpose hereinbefore set forth.

3. The combination, with a seed-distributing wheel, of a pivoted grasping-jaw, $f$, provided with a side arm, $n$, projecting laterally from the rear extension of said jaw, and a plunger-rod, $i$, and spring $h$, said plunger arranged to press upon the heel of the grasping-jaw, substantially as set forth.

4. The combination of the open-heel runner, the seed and fertilizer receptacles, the reciprocating slide provided with receptacles to receive the fertilizer, and an agitator fixed to and moving with the slide, and operated with the same movement that operates the flipper-valve, as and for the purpose hereinbefore set forth.

5. In a combined drill and check-row planter, a supplemental heel, substantially as and for the purpose hereinbefore set forth.

LYMAN J. CORBIN.

Witnesses:
A. O. BEHEL,
THOMAS FERGUSON.